D. McKENZIE.
Bakers' Ovens.
No. 139,802.
Patented June 10, 1873.
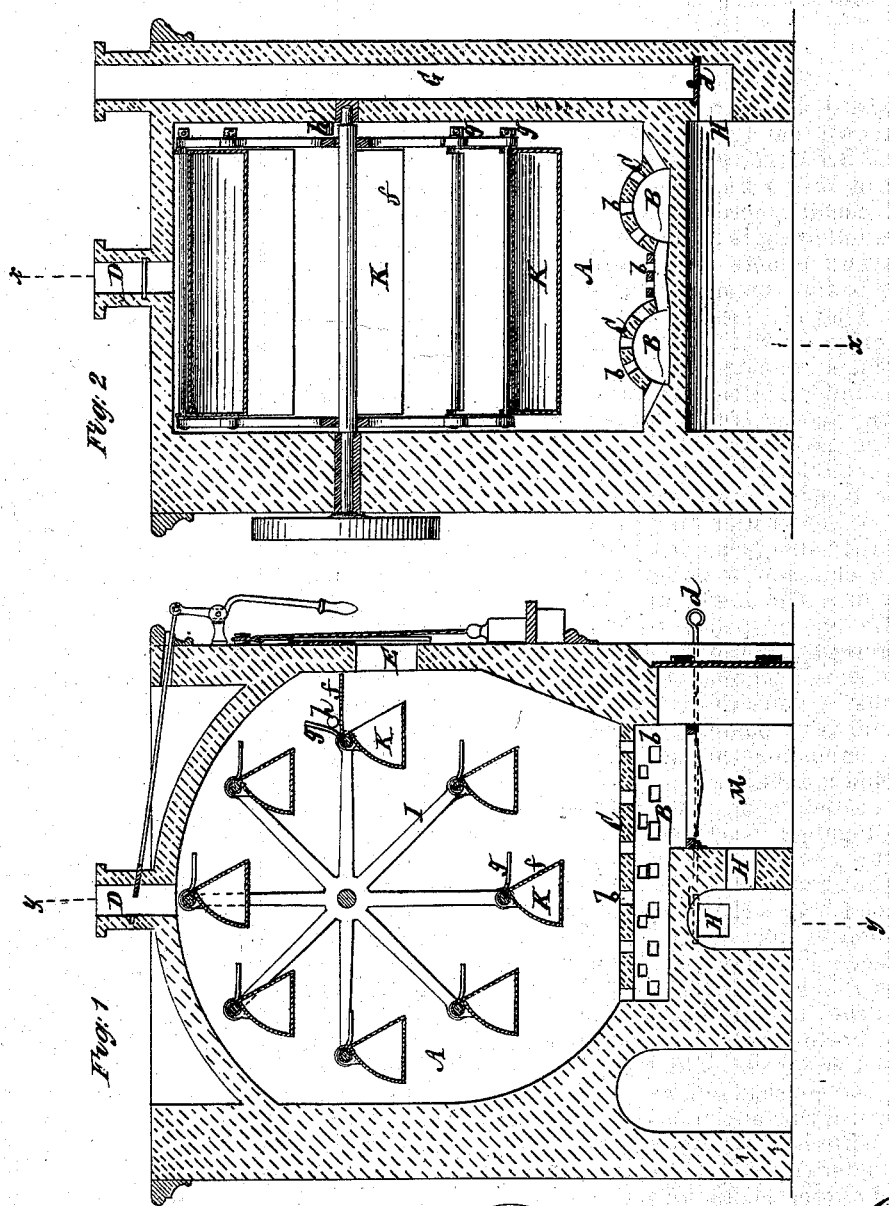

UNITED STATES PATENT OFFICE.

DUNCAN McKENZIE, OF BROOKLYN, NEW YORK.

IMPROVEMENT IN BAKERS' OVENS.

Specification forming part of Letters Patent No. 139,802, dated June 10, 1873; application filed April 9, 1873.

*To all whom it may concern:*

Be it known that I, DUNCAN MCKENZIE, of the city of Brooklyn, in the county of Kings and State of New York, have invented certain new and useful Improvements in Ovens, of which the following is a specification:

This invention more particularly relates to ovens for baking bread or crackers, and the one part of it has special reference to that class of ovens in which a system of flues is used, arranged to communicate between the fire-places and the interior of the oven directly through the floor or bottom of the latter. In this relation the one part of the invention consists in a combination with a perforated oven-bottom or furnace-crown, through which the products of combustion may be allowed to pass into the baking-chamber and from thence through a chimney or outlet at top of said chamber; of a side flue or flues arranged below the fire, an independent chimney or outlet in connection therewith, and an inlet for air to the baking-chamber for the purpose of establishing a down-draft through the fire when required in place of passing the products of combustion through the oven. By this combination the fire may be set going and the oven heated, in the first instance; or the baking altogether be effected, if desired, by passing the gaseous products of combustion through the oven, and so that the substance to be baked is exposed thereto; or the baking may be done wholly by radiation from the oven-surfaces, subject to continuance or maintenance of the heat by a down-draft through the fire. The invention also relates to the revolving bread-carrying reel or reels, commonly used in ovens of the description referred to, and consists in a closed bread-holder or tray, or rather any number of such trays, provided with lids for baking the bread or crackers under cover, said lids being opened and closed automatically for introducing and removing the bread as each holder comes opposite the bread receiving and discharging opening in the cover.

In the accompanying drawing, which forms part of this specification, Figure 1 is a vertical section taken as indicated by the line $x\ x$ in Fig. 2, which latter is also a vertical section taken as denoted by the line $y\ y$.

Similar letters of reference indicate corresponding parts.

A is the baking-chamber, heated by any desired number of fire-places, B B, the gaseous products of combustion from which are passed directly into the baking-chamber through flues or perforations $b$ in the crowns of the furnaces or arched bottom C of the baking-chamber, when it is desired to expose the bread to be baked to the products of combustion; or when first lighting the fire or heating the oven the draft is made through the baking-chamber and out through a chimney or opening, D, at the top. When, however, it is not desired to bake by direct exposure to the gaseous products of combustion, but by radiation from the heated surfaces or bottom C of the oven, then the draft is closed through the chimney D, the receiving-aperture E for the bread or any other suitable inlet opened to admit air to the baking-chamber above the fire, and a damper, $d$, opened to establish communication between a chimney, G, and a flue or flues, H, arranged to connect with the ash-pit or pits M of the fire-places, whereby a down-draft through the fire is produced to promote combustion, the doors of the ash-pits being closed. I is the revolving reel arranged within the baking-chamber and provided with bread-holders K, which are caused, either by positive or other means, to occupy a horizontal position during the rotation of the reel. These bread-holders are of a close or box-like construction for the purpose of baking the bread under cover, and are each provided with a lid, $f$, to the pivot of which is attached a lever, $g$, that, as the reel I revolves and at the close of each revolution of a bread-holder, comes in contact with a stop, $h$, to throw and hold open the lid of said holder as the latter passes the receiving and discharging aperture E of the baking-chamber, for the purpose of removing the baked charge of bread from said holder and of introducing a fresh load to be baked.

What is here claimed, and desired to be secured by Letters Patent, is—

1. The combination, with the perforated oven-bottom C, the baking-chamber A, and smoke outlet or chimney D, of the flue or flues H, and chimney G in communication with the fire place or places from below, and an air-inlet, E, to the baking-chamber above the fireplaces, substantially as and for the purposes herein set forth.

2. The closed bread-holders K of the revolving reel I, provided with the lids $f$ for operation in concert with a stop to automatically open the same in relation with the opening E through which the bread is received and discharged, essentially as described.

DUNCAN McKENZIE.

Witnesses:
FRED. HAYNES,
MICHAEL RYAN.